July 1, 1952 — D. E. KENYON — 2,602,162
RADIO BEACON
Filed April 10, 1947 — 4 Sheets-Sheet 1

INVENTOR
DAVID E. KENYON
BY
ATTORNEY

July 1, 1952   D. E. KENYON   2,602,162
RADIO BEACON
Filed April 10, 1947   4 Sheets-Sheet 2

INVENTOR
DAVID E. KENYON
BY
ATTORNEY

Patented July 1, 1952

2,602,162

UNITED STATES PATENT OFFICE 2,602,162

RADIO BEACON

David E. Kenyon, Cold Spring Harbor, N. Y., assignor to The Sperry Corporation, a corporation of Delaware Application April 10, 1947, Serial No. 740,693

19 Claims. (Cl. 343—112)

This invention relates to radio navigation beacons and more particularly to automatic, frequency-modulated, beacon systems.

Accordingly, a principal object of the invention is to provide continuous, automatic radio beacon means affording a visual presentation on a craft, of the beacon identification and direction relative to the craft.

Another object of this invention is to provide continuous, automatic radio beacon means adapted to be connected to cooperate with radar navigation apparatus.

Another object is to provide automatic radio beacon means comprising a nondirectional, continuously operating radio beacon sending an identification signal, and craft radio means, including a directional antenna, adapted to visually present said identification signal in synchronism with the indicated bearing of said beacon relative to said craft.

Another object is to provide an easily added improvement to present radar navigation apparatus by furnishing directional beacon information to thereby present an indication on the radar scope, which will identify the beacon and define its bearing.

In existing radar beacons of the transponder type, there is generally a serious problem of frequency tolerance control. This is because all craft radar receivers must be accurately tuned to their own individual transmitters, and inasmuch as all craft receivers must also be responsive to the beacon transmitter, all the craft transmitters would have to operate on exactly the same frequency. This is very difficult to accomplish, as the frequencies of individual power oscillator tubes are subject to considerable variation, and furthermore it is not desirable as it would create a great deal of radar interference. If different radar and beacon frequencies are used in existing systems, a separate beacon local oscillator must generally be used and both frequencies cannot be indicated simultaneously.

The present invention solves this problem by transmitting a recurrent sequence of different frequencies which are received by separate craft panoramic receivers. Therefore, the craft radar transmitters and receivers may each operate at their individual frequencies and the panoramic receivers provide the beacon information separately to the radar indicator scope.

Another problem involved in presenting this type of information on a visual indicator, such as a plan position indicator (PPI), is that of synchronizing the received signals with the direction of the beacon and with the indicator presentation.

This invention solves this problem by utilizing an omnidirectional beacon transmitter continuously transmitting frequency modulated signals, in combination with craft radio apparatus of the type having a directional antenna, a bearing indicator and, as taught by the invention, a special panoramic beacon receiver.

The invention also relates to the novel features or principles of the instrumentalities described ⊥erein, whether or not such are used for the stated objects, or in the stated fields or combinations.

This invention will be more fully explained in connection with the following figures of which:

Figure 1:
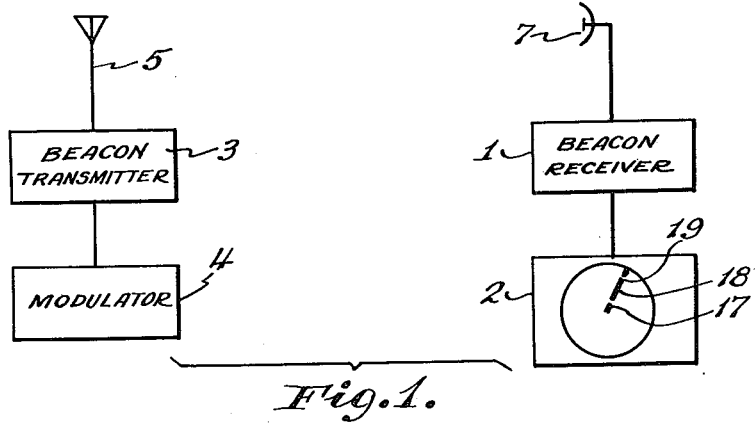
Fig. 1 is a schematic diagram of the invention.

Referring to Fig. 1 there is shown a beacon station apparatus and the craft receiving apparatus. The beacon station comprises a transmitter 3 operably connected to a modulator 4 and to an omnidirectional antenna 5. The transmitter may be of low or medium power, for instance in the microwave frequency band, a klystron tube may be used as the power oscillator. The transmitter 3 may take the form of that described in copending application Serial No. 740,692, filed March 4, 1947, in the names of David E. Kenyon and Hirstle M. Hammond, for Modulating and Transmitting Apparatus. The modulator 4 is adapted to frequency modulate, that is, shift the carrier frequency of transmitter 3 proportionally to a coded identification signal which may be for purposes of illustrating a signal letter in conventional Morse code. The omnidirectional antenna 5 may be a simple dipole for high frequency operation, and it should be mounted high enough to provide a desirable line of sight range.

The craft radio beacon receiving means comprises a beacon receiver 1 operatively connected to a directional antenna 7 which is adapted to be rotated, and indicating means 2 operably connected to the output of a beacon receiver 1.

The beacon receiver 1 is a panoramic receiver, that is, its frequency is adapted to be periodically swept through a frequency band. A convenient form of the indicating means 2 may be a cathode ray tube of the type using plan position (PPI indication). The indicator sweep voltage is synchronized with the panoramic sweep voltage of the beacon receiver 1.

As previously mentioned the beacon transmitter 3 may be frequency modulated by identification signals which may be single letters consisting of dots and dashes. As the craft directional antenna 7 is pointed towards the beacon transmitter 3, it is desired that the beacon receiver 1 shall receive these dots and dashes and present them visually on the indicator 2 as shown by dot 17, dash 18 and dot 19.

The directional part of this indication is automatically taken care of by the indicator sweep voltage rotating in azimuth in synchronism with the rotation of the directional antenna 7 in a manner similar to existing radar systems. The identification part of this indication, that is the arrangement of the dots and dashes on the indicator 2 will be more fully explained in connection with Fig. 2.

Figure 2:
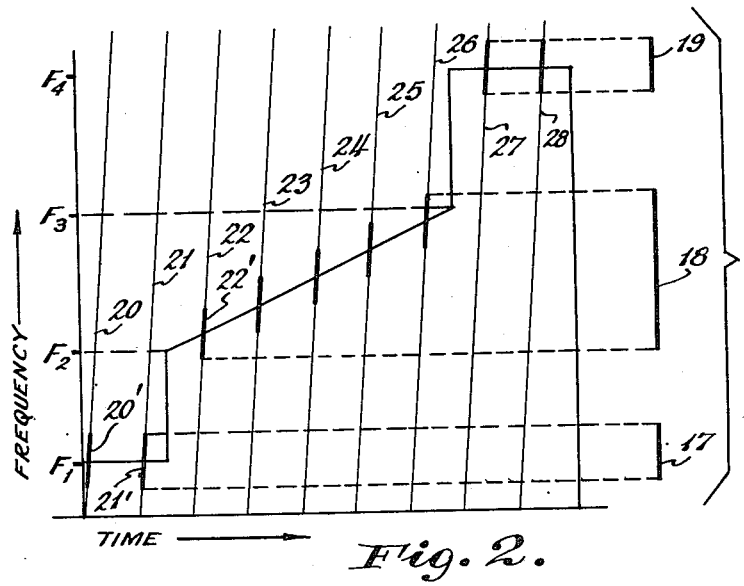
Figure 2 is a chart illustrative of the principle of the invention.

Fig. 2 shows a typical beacon frequency modulated transmission plotted against time. Thus, it is seen that the beacon transmitter 3 transmits a frequency of $F_1$ for a certain time, sharply jumps to $F_2$ then gradually changes its frequency to $F_3$, jumps to $F_4$, and then transmits $F_4$ for a certain time, this sequence being periodically repeated. The lines 20, 21 and 22, etc. represent the frequency excursions of the panoramic receiver 12 plotted against time. Thus, as the receiver frequency increases along line 20, it receives a response to the frequency $F_1$ which is then being transmitted by the beacon, the length of time of reception indicated by the heavy line 20' as determined by the bandwidth of the receiver.

On the next frequency excursion of the receiver represented by line 21, a similar response to frequency $F_1$, as indicated by the heavy line 21', is received. Responses 20' and 21' coincide in frequency and produce a short signal 17 or a "dot" on the cathode ray indicator screen. The next frequency excursion, indicated by line 22, receives a response 22' at some frequency between $F_2$ and $F_3$. The following four excursions indicated by lines 23, 24, 25 and 26, all receive responses between $F_2$ and $F_3$, and it is noted that these responses overlap, producing a long continuous signal, or a "dash" 18 on the persistent cathode ray screen. The next two frequency excursions indicated by lines 27 and 28 receive responses at frequency $F_4$, which responses coincide to produce signal 19.

Therefore, it is seen that the visual response indicated along the radio sweep trace of the cathode ray indicator 10 will be as indicated by signals 17, 18 and 19—a dot, a dash and a dot—thereby identifying the beacon. There is no synchronism between the repetition rate of the frequency modulated beacon transmission and the repetition rate of the receiver frequency excursions. It is desirable that the receiver repetition rate be several times that of the transmitter repetition rate. It is also desirable to sufficiently separate the transmitted frequencies, namely; $F_1$ from $F_2$ and $F_3$ from $F_4$ so that there will be adequate spacing between the visual signals.

The transmitter beacon repetition rate must be correlated to the rotation rate of directional antenna 7 and its beam width, so that as the antenna 7 rotates past the beacon it will receive the transmitted code letter at least once, preferably several times.

Figure 3:
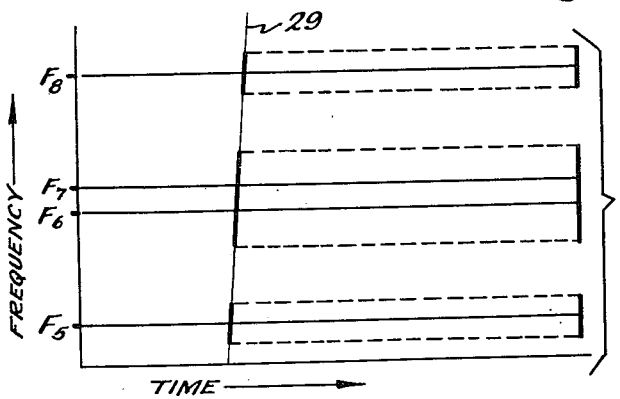
Fig. 3 is a chart illustrative of another embodiment of the invention.

Fig. 3 is illustrative of another system wherein the beacon transmitter 3 transmits several frequencies simultaneously and the beacon receiver sweeps through the entire frequency range, receiving each frequency in turn. In this system dashes may be generated by utilizing two transmitter frequencies, such as $F_6$ and $F_7$ of Fig. 3 close enough together so that the received band width of each frequency will overlap producing a single long received transmission. Fig. 3 illustrates the reception of a "dot," "dash," "dot" signal as the receiver frequency sweeps along the line 29 receiving a "dot" as it passes $F_5$, a "dash" as it passes $F_6$ and $F_7$ and a "dot" as it passes $F_8$.

Figure 4:
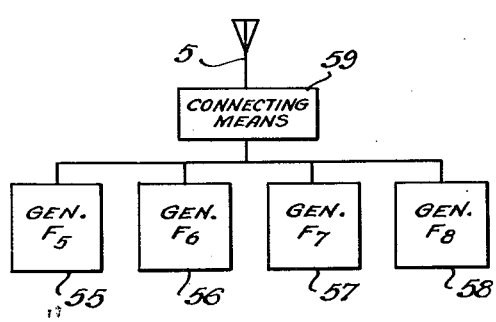
Fig. 4 is a block schematic diagram of an embodiment of a beacon transmitter.

Referring to Fig. 4, there is shown an embodiment of the beacon transmitting means operating on the principle illustrated in Fig. 3; that is, simultaneously transmitting a plurality of different frequencies which are received as dots or dashes by the panoramic receiver depending upon their distribution within the receiver frequency spectrum. The individual frequencies $F_5$, $F_6$, $F_7$ and $F_8$ are generated, respectively, by generators 55, 56, 57 and 58. These generators are connected to the antenna 5 through output connecting means 59. The separate generated frequencies may be either all carrier frequencies or one carrier frequency and the others modulating that carrier frequency.

Figure 5:
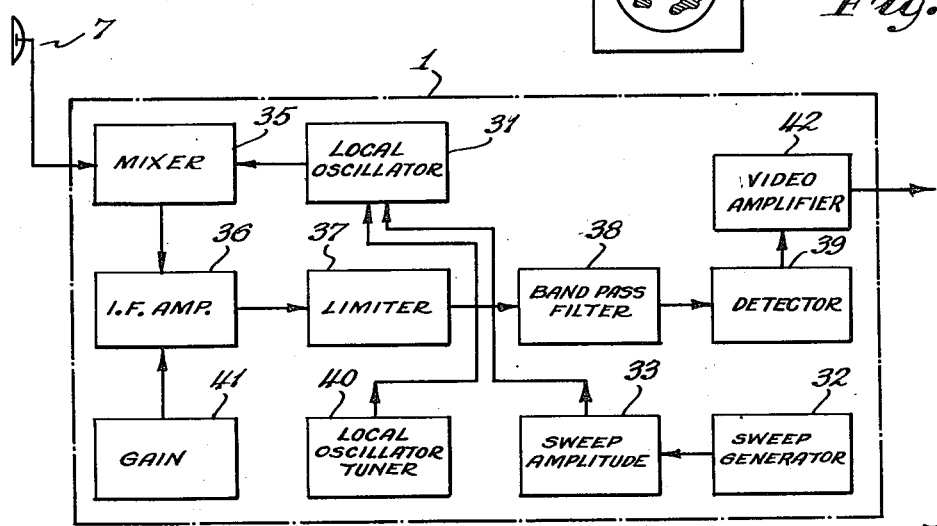
Fig. 5 is a block schematic diagram of an embodiment of a beacon receiver.

Fig. 5 illustrates a schematic block diagram of beacon receiver 1. The sweep voltage which sweeps the frequency of local oscillator 31, is received from the sweep voltage generator 32 through an amplitude control 33. As the local oscillator 31 frequency sweeps through its desired band, the receiver 1 receives all frequencies in that band from the directional antenna 7. The R. F. signals and the local oscillator signals are heterodyned in mixer 35 and applied to intermediate frequency amplifier 36. The output of intermediate frequency amplifier 36 is limited by amplitude limiter 37 and the limited output is applied through bandpass filter 38 to detector 39 and video amplifier 42. The central local oscillator frequency may be set by the tuning control 40 and the gain of the I. F. amplifier may be set by gain control 41.

The characteristics of limiter 37 and bandpass filter 38 are chosen so as to automatically control the intensity of the intermediate frequency amplifier output as the receiver operating frequency is swept through the beacon transmitter frequencies. The two-fold purpose of this automatic intensity control is first to prevent overloading of the succeeding stages by high intensity signals and secondly to raise low intensity signals to the indicator threshold. The function of the limiter 37 is to avoid overloading but it also has the undesirable effect of broadening the intermediate frequency amplifier response. Therefore, the relatively narrow bandpass filter is added to overcome this broadening effect.

The result of the automatic intensity control of limiter 37 and bandpass filter 38 is to present all of the received signals in the indicator at a constant intensity, and thus avoid losing low intensity signals and also avoid the blurring or running together of strong signals. For instance, if two beacon stations were being received simultaneously, one of which was much closer than the other or putting out a much stronger signal and the gain control was manually set to prevent overloading by the stronger station, then the weaker station would not be received. Conversely, if the gain control were set to receive the weaker station then the stronger station would overload the system components. Bandpass filter 38 also improves the signal to noise ratio, as only the frequencies in the narrow band desired for intelligence are passed by it.

Random interference of an electrical or radio nature which is received by the beacon receiver will tend to be averaged out, in the cathode ray tube presentation, against the background noise, as the desired signals are reinforced at the sweep repetition rate, whereas the interference will occur randomly.

The addition of the limiting means and bandpass filter cooperates with this integrating function of the indicator screen, to improve the signal to noise ratio, and the indicated signal resolution. These features plus the additional factor that the beacon receiving antenna may be made highly directional enables the beacon receiver to indicate signals from several beacons concurrently providing they are not on the same bearing.

Figure 6:
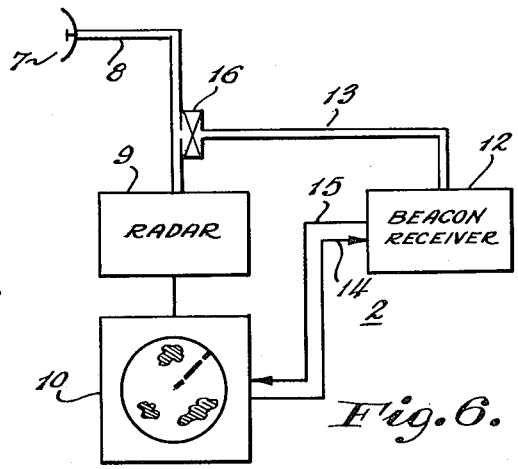
Fig. 6 is a schematic block diagram of the invention used in connection with a conventional radar system.

Fig. 6 shows the invention adapted to be used in cooperation with a conventional radar system. The radar system comprises the directional antenna 7 connected by wave guide 8 to radar transmitter-receiver 9 which in turn is connected to the radar indicator 10, of the PPI type. The present invention adds the beacon receiver 12 which is connected to the directional antenna 7 by means of wave guide 13 which is connected to a T section in wave guide 8 through transmit-receiver (T-R) box 16. Beacon receiver 12 is of the panoramic type previously mentioned and its frequency is adapted to be periodically swept through a predetermined frequency band in synchronism with the radar indicator sweep voltage which is received from the radar indicator 10 on lead 14. The video output of the beacon receiver, that is, the received "dots" and "dashes" which identify the beacon are applied to the radar indicator 10 through lead 15. The PPI indicator sweep voltage rotates in synchronism with the directional antenna 7. Therefore, when the beacon identification signal is received by the beacon receiver 12, it will appear on the indicator 10 along the bearing of the beacon station relative to the craft as illustrated. This information is presented on the indicator in addition to the other radar information received from nearby targets.

Figure 7:
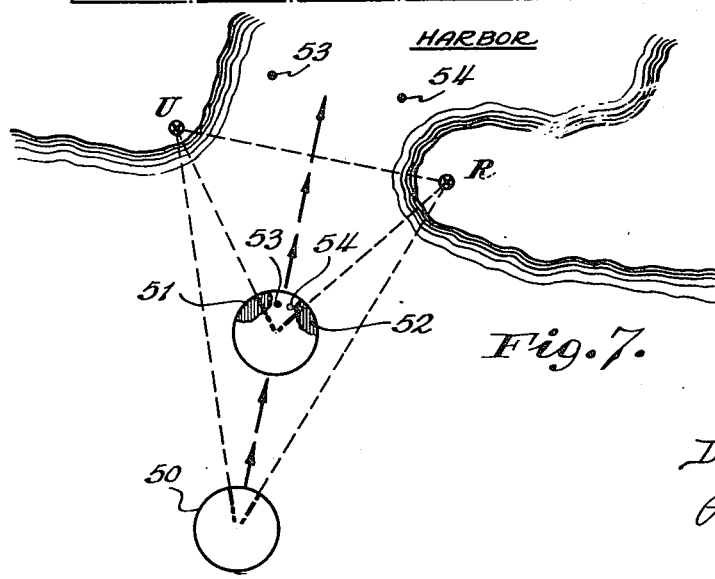
Fig. 7 is a map illustrative of the operation of the invention.

Referring to Fig. 7, it is seen that several beacon stations may be received simultaneously to thereby provide automatic, continuous, visual navigational fixes and range information on the radar indicator. This illustration shows a map of a harbor entrance area having two beacon stations, U and R located on opposite sides of the harbor entrance. Beacon U transmits the dot, dot, dash signal and beacon R transmits a dot, dash, dot signal. The craft indicator 50 illustrates the visual beacon presentation on a craft. If the base line distance between beacon U and R is known, a relatively accurate navigational fix may be easily obtained. As the craft moves along the prescribed course to location 51, the angle between the two beacons will widen and land indications 52 and buoys 53 and 54 will be picked up by the radar system thus affording accurate range information. The beacon reception station is operative even if the radar transmitter is not operating and it extends the range of the radar indication system considerably as the beacon signals may be picked up on a much further range than target echoes. This range may be further increased by mounting the beacon stations very high, for instance, on a mountain top or a high cliff. Thus, it is seen that when the beacon receiver is used in conjunction with a radar, the beacon range may be determined by the observation of a simultaneous presentation of beacon and radar signals, whenever the location of the beacon transmitter is known with respect to the shore line or other radar targets.

Figure 8:
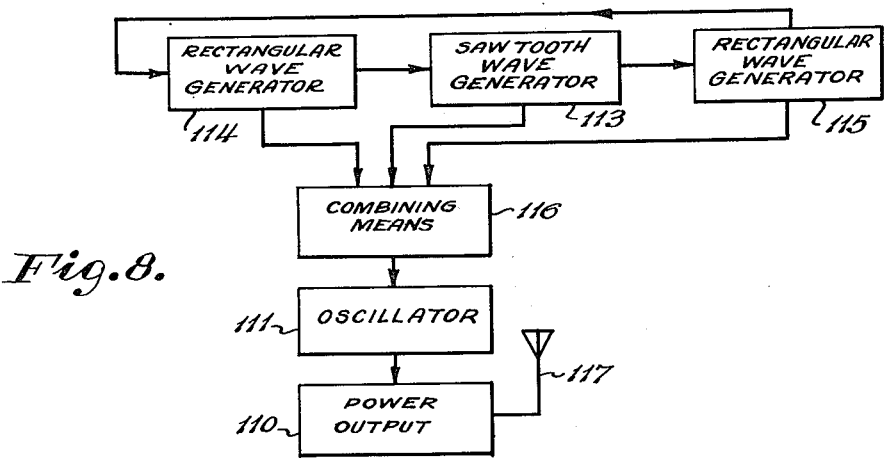
Fig. 8 is a block diagram of an embodiment of a beacon transmitter.

Fig. 8 illustrates a schematic block diagram of an embodiment of a beacon transmitter of the type disclosed in the above-mentioned application Serial No. 740,692, filed March 4, 1947, in the names of David E. Kenyon and Hirstle M. Hammond, for Modulating and Transmitting Apparatus. It comprises a power output stage 110 which in turn is operably connected to suitable wave forming circuits. These wave forming circuits perform the function of providing the coded wave form modulation, that is, providing a wave form such as that illustrated in Fig. 2. The wave forming operations may be performed by suitable combinations of oscillators, rectangular wave generators and sawtooth wave generators. Thus the complex wave form 97' of Fig. 10 may be broken down as follows: portion A is a rectangular wave of low amplitude; portion B comprises a sawtooth wave of a higher average level; and portion C a rectangular wave having a still higher average level. Each portion of the complex wave is generated by one of the separate generators and their outputs are combined together in the desired sequence by combining means 116, and then applied to oscillator 111.

The separate wave forming circuits illustrated in Fig. 8 comprise a rectangular wave generator 114 to provide portion A of the wave form; a sawtooth voltage generator 113 having a higher average voltage level to provide the sloping part, i. e., portion B, of the wave form; and another rectangular wave generator 115 to form the portion C. The rectangular wave generators may be multivibrators or square wave generators, and one must be a free running multivibrator to initiate the cycle. The three wave forming generators are arranged to be triggered by the preceding generator at the conclusion of the preceding portion of the wave form.

The sequence of the operation cycle may be described as follows: assuming the free running generator to be generator 115, it initiates the first cycle and triggers the rectangular wave generator 114 which forms portion A of the wave form, and at the conclusion thereof triggers sawtooth generator 113. Sawtooth generator 113 forms portion B of the wave form and at the completion thereof triggers off rectangular generator 115 which forms portion C. The sum of the time durations of the three waveforms must be chosen less than the period of the free running multivibrator, so that the succeeding cycles will be self-triggering.

Figure 9:
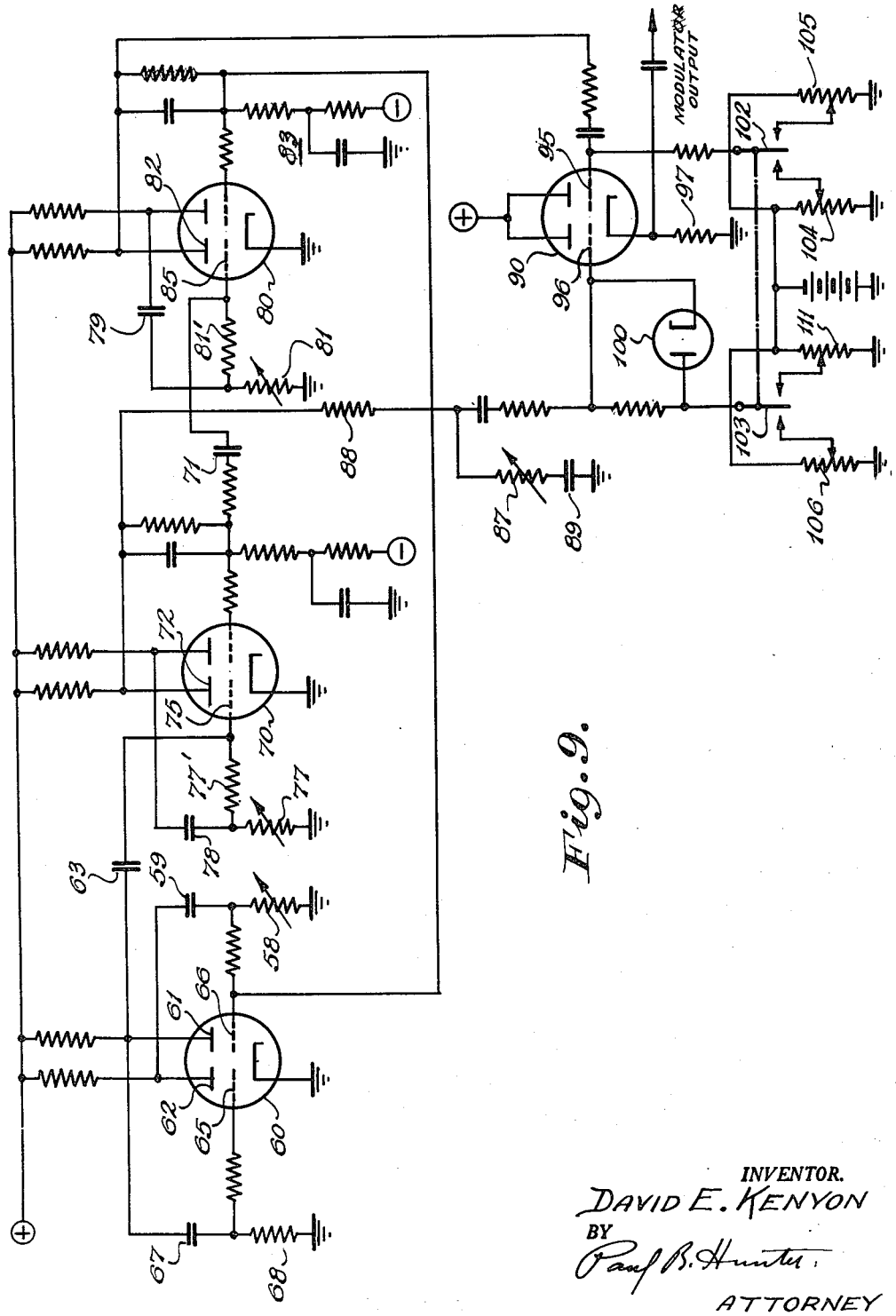
Fig. 9 is a schematic diagram of an embodiment of a beacon modulator.

Fig. 9 is a schematic diagram of such a modulator circuit arranged for generation of an R or dot-dash-dot code. Referring to the sketch, vacuum tube 60 and associated circuit is a free running type of multivibrator; tube 70 and tube 80 circuits are "one shot" multivibrators, that is, must be triggered each cycle; tube 90 is a cathode follower and mixer, and tube 100 is a D. C. restorer. The sequence of operations may be described by referring to the wave forms of Fig. 10 which each have the same number, plus a prime mark, as the component where they occur, for instance, plate 61 has a wave form 61'.

Assume that plate 61 of tube 60 is conducting, plate 62 is not conducting, and grid 65 is held below cutoff by a charge on capacitor 67. When capacitor 67 discharges sufficiently through resistor 68 to reach the cutoff level of grid 65, plate 62 of tube 60 conducts and grid 66 is driven below cutoff. The result is a rectangular voltage wave on plate 61, shown as wave form 61' of Fig. 10, the duration of the positive portion of which is determined by the time constant of resistor 58 and capacitor 59. In a specific embodiment where resistor 58 is equal to 1 megohm and condenser 59 to .002 mf., it will take approximately 3500 microseconds for grid 66 to rise to cutoff as condenser 59 must charge from −260 v. toward +40 v. and cutoff is reached at −12 volts bias.

The resistor 68, capacitor 67 time constant is chosen large to hold grid 65 cutoff for the remainder of the cycle. The square wave 61' is then differentiated by capacitor 63 and resistors 77 and 77', thereby producing a wave form 75' illustrated in Fig. 10, which is then applied to grid 75 of tube 70, which grid is normally at zero bias. The negative pip corresponding to the negative going edge of square wave 61' drives grid 75 below cutoff momentarily, and plate 72 of tube 70 therefore stops conducting, giving rise to a square wave 72', the positive duration of which is determined by the time constant of resistor 77 and capacitor 78. For purposes of illustration, if resistor 77 is equal to one megohm and condenser 78 is equal to .008 microfarad, it would take approximately 14,000 microseconds for grid 75 to rise to cutoff potential since it must rise from −260 volts to +40 volts.

Figure 10:
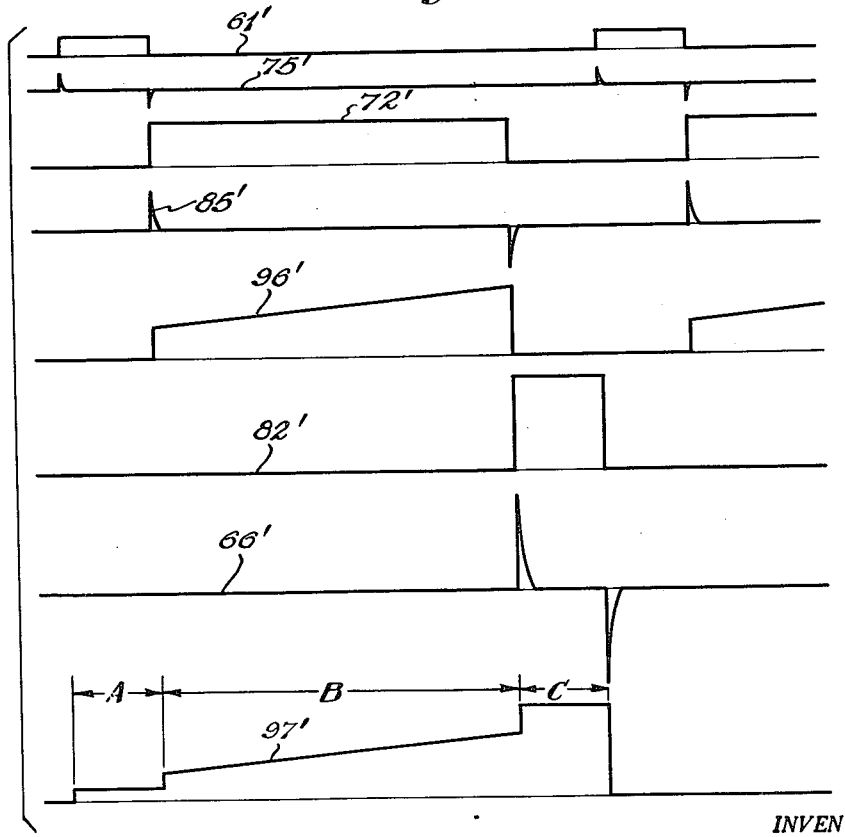
Fig. 10 is a series of wave forms illustrative of the operation of the transmitter of Fig. 9.

This square wave 72' of Fig. 10 is differentiated, by capacitor 71 and resistors 81 and 81', thereby producing wave form 85' which is applied to grid 85 of tube 80 which is normally at zero bias and the negative pip corresponding to the negative going edge of square wave 72' causes grid 85 to be driven momentarily below cutoff. This results in a square wave 82' occurring at plate 82, the positive duration of which is determined by the time constant of resistor 81 and capacitor 79. This time constant has been chosen for illustration to be equal to that of capacitor 59 and resistor 58. Therefore, the time duration of the positive portion of square wave 82' is equal to that of square wave 61', approximately 3500 microseconds for the illustrative values chosen.

The square wave 82' is differentiated by the differentiating circuit at 83, thereby producing wave form 66' which is applied to grid 66 of tube 60. The negative pip of wave form 66', corresponding to the negative going portion of square wave 82', drives grid 66 momentarily below cutoff and a second cycle is thereby initiated.

Returning to the square wave 72', it is also applied to a network comprising the resistors 87 and 88 and capacitor 89, thereby producing at grid 96 the wave form 96' which consists of an initial instantaneous voltage rise followed by a sloping voltage rise. The initial instantaneous voltage rise is determined primarily by the ratio of the resistances of resistors 87 and 88 and the slope is determined by the time constant of the total resistance of resistors 87 and 88 and the value of capacitor 89. The wave form 96' is utilized to obtain that portion of the modulation voltage which produces the "dash" signal.

Tube 90 is a cathode follower which is used to mix the various wave forms previously discussed in the desired sequence and obtain a complex voltage output across its cathode output resistor 97, which output is then applied to the power oscillator, for instance, to the reflector of a klystron type tube, in order to obtain the desired frequency modulation characteristic in the transmitted output.

The square wave 82', previously mentioned, is applied to the other grid 95 of tube 90. The average D. C. voltage level of grid 95 is determined by the bias supplied through switch 102 by potentiometer 105. In a similar manner, the setting of the potentiometer 111 determines the D. C. voltage bias of grid 96 through switch 103 and therefore the reference level of the "dash" wave form 96' which is applied to grid 96.

Tube 100 is a D. C. restorer diode which restores the D. C. voltage level of grid 96 to the bias level of potentiometer 111.

The sequence of wave forms producing the desired combined voltage wave form output 97' across the cathode of resistor 97 of tube 90 is as follows:

*Portion A.*—The D. C. voltage level across resistor 97 as determined by the bias voltage settings of potentiometers 105 and 111 is maintained for the positive duration of the square wave 61' as both grids 95 and 96 of tube 90 are at a fixed level during this period;

*Portion B.*—The sloping top wave 96' is then applied to grid 96 resulting in an initial sharp rise in cathode voltage followed by a slow rise due to the shape of this wave form;

*Portion C.*—The square wave 82' is applied to grid 95 at the exact time that the sloping wave form 96' is decreasing to its reference level. The amplitude of the (C) portion depends on the peak amplitude of square wave 82' and the bias applied to grid 95. At the trailing edge of square wave 82', the cathode of tube 90 again returns to the D. C. reference voltage determined by the bias applied to grid 96, and the negative pip of wave form 66', corresponding to the trailing edge of square wave 82', initiates a new cycle.

As the frequency sequence of coded characters transmitted is determined by the relative voltage levels applied to the output stage, which may be a klystron type tube, this sequence may be determined by the settings of potentiometers 105 and 111. For the wave form just described, an R code is produced, as the voltage sequence is dot-dash-dot.

A dot-dot-dash code may be obtained from the same circuit. Assume that switches 102 and 103 are thrown to the other potentiometers 104 and 106 and that their settings are such that the sloping top wave form 96' is added to a high D. C. bias on grid 96 and the square wave 82' is added to a medium D. C. bias on grid 95. The resulting code will then be dot-dot-dash or U code.

With the circuit shown, an S dot-dot-dot code can also be obtained by adjustment of resistor 87 such that a substantially flat-topped square wave is applied to grid 96 of tube 90. In this case, if the resistance of resistor 87 is made, say nine times greater than resistor 88, the initial rise of wave form 96' will be practically the full rise and it will be practically a square wave. The modulating wave form output will then contain three stepped voltage levels. The multivibrator time constants should be so adjusted that these are of equal time duration.

If two rather than three characters are desired, this result can be obtained by adjustment of the potentiometer 104 or 105, such that the square wave applied to grid 95 does not reach a value above cutoff. A "dot-dot" or "dot-dash" can then be obtained by adjustment of resistor 87.

Codes of more than three characters may be obtained as follows. Successive dots may be generated by the addition of a multivibrator in the "chain," a cathode follower mixer, and a D. C. restorer for each dot.

Successive dashes may be added in a similar manner by the use of a longer R. C. constant, and R. C. network for sloping the top, and an additional D. C. restorer for each dash added.

The repetition rate is determined by the sum of the time intervals for each multivibrator in the chain. For example, with the dot-dash-dot described, a dot square wave width of 3000 microseconds and a dash square wave width of 14,000 microseconds, the time per cycle will be 20,000 microseconds which is a repetition rate of 50 cycles.

Thus, it is seen that the panoramic receiver frequency is swept through the beacon transmitter frequency band in synchronism with the sweep voltage of the PPI indicator, and the beacon receiver output is then applied to the PPI indicator. The received beacon azimuth indication is presented in coded form along the PPI sweep length thereby identifying and defining the direction of the beacon transmitting stations.

The beacon transmitter is continuously operated at a suitable repetition rate and the received indications are synchronized on the PPI indicator by the synchronism between the sweeping of the receiver oscillator frequency and the sweep voltage of the indicator. There is no synchronism between the beacon repetition rate and the receiver. The azimuth information is automatically taken care of by a conventional rotating directive antenna system, the rotating sweep voltage of the indicator rotating in synchronism with the directional antenna, thereby presenting the beacon identification signal along the beacon azimuth. The beacon receiver cooperating with a radar system may use the same directional antenna as the radar system.

The invention may be used in cooperation with a radar system or may be used independently and it is not limited to the microwave frequency region but may be used in any frequency band. For instance, it may be used in the long wave bands for reception at great distances.

The invention is easily adapted for use with conventional radar systems to thereby add navigational information to the radar information. For instance, when approaching a coast line, beacon signals affording an automatic navigational fix, will be received by means of the invention, long before radar echoes are received.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Certain subject matter disclosed herein relating to transmitting and modulating apparatus as in Fig. 9 may be claimed in copending application S. N. 740,692, filed March 4, 1947, in the names of David E. Kenyon and H. M. Hammond for modulating and transmitting apparatus.

What is claimed is:

1. In a radio beacon system, a radio transmitter modulated to transmit signals of different frequencies in a predetermined arrangement within a predetermined frequency band and having a predetermined time sequence, craft radio means responsive to said transmitted signals comprising a rotatable directional antenna, a receiver connected to said directional antenna and adapted to have its operating frequency swept through said predetermined frequency band to thereby detect the transmitted frequency arrangement modulation, and indicating means responsive to said receiver to indicate said signals and responsive to said directional antenna to indicate the direction of said signals.

2. In a radio beacon system, a radio transmitter modulated to transmit signals having a predetermined frequency sequence, craft radio means responsive to said transmitted signals comprising a rotatable directional antenna, a panoramic receiver connected thereto adapted to receive said frequency signals separately, and indicating means responsive to said receiver to integrate said signals and to said directional antenna to indicate the bearing of said signals.

3. In a radio beacon system, a plurality of radio transmitters each modulated to transmit signals having definite time and frequency spacings, craft radio means comprising a rotatable directional antenna, a receiver adapted to receive said signal frequencies separately, and visual indicating means responsive to said receiver to continuously integrate and detect said modulated signals synchronized according to said definite frequency variations, and responsive to said directional antenna to indicate the bearing of said transmitters to thereby provide a navigational fix for the craft.

4. Transmitting means at one location to transmit an identifying sequence of frequencies having a definite distribution within a certain frequency spectrum, and panoramic receiving means responsive to said frequencies including signal storage means to thereby identify said transmitting means according to said frequency distribution within said frequency spectrum.

5. Transmitting means at one location adapted to transmit a sequence of frequencies within a certain frequency spectrum, the distribution of said frequencies within said spectrum being arranged to convey intelligence, and receiving means adapted to sweep said spectrum and receive said frequencies separately including signal indicating means adapted to indicate the intelligence contained in said frequency distribution.

6. A panoramic modulation system comprising means to create wave forms having portions which have a rate of change of amplitude to represent dashes and portions which have no rate of change of amplitude to represent dots, said portions being separated by substantially instantaneous changes of amplitude, transmitting means, means to shift the frequency of said transmitting means within a certain frequency band proportionally so said wave forms, panoramic receiving means adapted to periodically sweep said frequency band, said sweep duration having a period substantially different than said wave form period and signal storage detecting means adapted to detect dashes from said variable frequency transmissions and dots from said constant frequency transmissions.

7. Transmitting means adapted to periodically transmit a definite identification frequency variation within a certain frequency band and in a predetermined time sequence, panoramic receiving means adapted to periodically sweep said frequency band at a rate other than said transmitter repetition rate, and means responsive to said receiving means including signal storage means to combine said signals additively and detect identification signals from said definite frequency variation.

8. Transmitting means adapted to transmit frequencies having a definite identification frequency distribution within a certain frequency band and in a predetermined time sequence, panoramic receiving means adapted to sweep said frequency band periodically and indicating means including signal storage means adapted to visually present the energy distribution in said frequency band to thereby identify said transmitting means.

9. In a radio beacon navigation system, means to transmit signals characterized by predetermined recurrent frequency spacings within a frequency band, comprising a power oscillator, means to vary the frequency of said power oscillator and means to key said power oscillator in said predetermined recurrent sequence; panoramic receiving means adapted to periodically sweep said frequency band; and means responsive to said receiving means to indicate said signals.

10. In a radio beacon navigation system, means to transmit signals having a recurrent frequency modulation, comprising a power oscillator, means to apply frequency modulation to said power oscillator, means to provide said recurrent frequency modulation envelope comprising a recurrent frequency oscillator, at least one dot generator and at least one dash generator; craft radio means responsive to said transmitted signals comprising a rotatable directional antenna, a panoramic receiver connected to said directional antenna, and indicating means responsive to said receiver to indicate said signals, and responsive to said directional antenna to indicate the direction of said signals.

11. In a radio beacon navigation system, means to automatically transmit frequency modulations representing recurrent codes of any combination of at least two characters, comprising power output means and frequency modulating means having at least one saw-tooth wave generator, at least one rectangular wave generator and means to combine the outputs of said generators in the desired modulation sequence; receiving means responsive to said transmitting means adapted to receive said signals selectively according to their direction and frequency, and indicating means responsive to said receiving means to indicate the identification and direction of said transmitter.

12. In a direction finding system, a directional wave collector for receiving waves of characteristic frequencies from a remote transmitter, a local oscillator for generating a local oscillator wave, a mixer for heterodyning said received waves and said local oscillator wave to produce beat frequency waves, selective amplifying means including an intermediate amplifier, limiting means and a bandpass filter, the characteristics of said limiting means and said bandpass filter being chosen to automatically control the intermediate frequency output to thereby pass discrete signals, an indicator having an indicating beam positional on a viewing screen, the intensity of said beam being varied in response to the amplitude of said selectively amplified waves, means for positioning said beam in accordance with the direction of said wave collector, and means for periodically deflecting said beam and simultaneously varying the frequency of said local oscillator whereby said beat frequency waves are swept past said predetermined range of frequencies to reproduce said characteristic frequencies on said indicator screen by characteristic indicating beam intensifications.

13. In a craft navigation system, a directional antenna adapted to be rotated, a radio receiver comprising means to periodically sweep the operating frequency of said receiver over a predetermined frequency spectrum, including local oscillator means adapted to be periodically varied, an intermediate frequency amplifier, amplitude limiting means connected to the output of said limiting means amplifier, a bandpass filter connected to the output of said limiting means, detecting means responsive to the output of said bandpass filter and amplifying means connected to the output of said detector, indicating means responsive to said receiver to indicate signal frequencies within said spectrum and responsive to said directional antenna to indicate the direction of said signals, including a cathode ray indicator having cathode ray beam sweep means in synchronism with said receiver frequency sweep means, and beam rotation means in synchronism with said directional antenna rotation.

14. In a craft navigation system, a directional antenna adapted to be rotated, a radio receiver comprising means to sweep its operating frequency over a predetermined spectrum, means to improve the signal to noise ratio and signal resolution including limiting means and a bandpass filter, indicating means responsive to said receiver to indicate signal frequencies within said spectrum and responsive to said directional antenna to indicate the direction of said signals including signal storage means to combine said signals additively.

15. In a radio navigation system, a radio transmitter adapted to transmit signals of different frequencies within a predetermined frequency band, craft radio means responsive to said transmitted signals comprising a rotatable directional antenna, a panoramic receiver, including limiting means and bandpass filter means, connected to said directional antenna and adapted to have its operating frequency swept through said predetermined frequency band, and indicating means responsive to said receiver to indicate said signals and responsive to said directional antenna to indicate the direction of said signals.

16. Transmitting means at one location to transmit a definite sequence of frequencies means to control the time spacing of said frequencies, said frequency sequence containing intelligence modulation, and panoramic receiving means to detect said intelligence by sweeping through said sequence frequencies.

17. Transmitting means at one location to transmit a definite arrangement of frequencies means to control the time spacing of said frequencies, said time frequency sequence containing modulated intelligence and panoramic receiving means to detect said intelligence by sweeping through said definite frequency arrangement.

18. Transmitting means at one location to transmit a definite frequency distribution means to control the time spacing of said frequency distribution, said time frequency distribution containing modulated intelligence and panoramic receiving means to detect said intelligence by sweeping through said distribution of frequencies.

19. In a radio navigation system a beacon transmitter having means to transmit a plurality of frequencies, means to modulate said transmitter comprising means to separate said frequency signals in the spectrum by predetermined amounts, means to arrange the time sequence of said separate frequency transmission in a predetermined manner whereby said spacing and said time sequence provides a modulation, and a craft panoramic receiver for detecting said modulation.

DAVID E. KENYON.

REFERENCES CITED

The following references are of record in the file of this patent:

UNITED STATES PATENTS

| Number | Name | Date |
|---|---|---|
| 1,309,459 | Carson | July 8, 1919 |
| 1,596,251 | Hammond | Aug. 17, 1926 |
| 2,036,164 | Usselman | Mar. 31, 1936 |
| 2,036,165 | Usselman | Mar. 31, 1936 |
| 2,042,490 | Zahl | June 2, 1936 |
| 2,090,359 | Robinson | Aug. 17, 1937 |
| 2,127,415 | Marique | Aug. 16, 1938 |
| 2,139,057 | Brochstedt | Dec. 6, 1938 |
| 2,191,730 | Sjostrand | Feb. 27, 1940 |
| 2,257,320 | Williams | Sept. 30, 1941 |
| 2,279,246 | Podliasky | Apr. 7, 1942 |
| 2,378,604 | Wallace | June 19, 1945 |
| 2,381,940 | Wallace et al. | Aug. 14, 1945 |
| 2,402,459 | Smith | June 18, 1946 |
| 2,403,603 | Korn | July 9, 1946 |
| 2,433,669 | Keister | Dec. 30, 1947 |
| 2,449,819 | Purington | Sept. 21, 1948 |